US008228989B2

(12) United States Patent  
Kim et al.

(10) Patent No.: US 8,228,989 B2  
(45) Date of Patent: Jul. 24, 2012

(54) METHOD AND APPARATUS FOR ENCODING AND DECODING BASED ON INTER PREDICTION

(75) Inventors: So-young Kim, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1217 days.

(21) Appl. No.: 12/019,747

(22) Filed: Jan. 25, 2008

(65) Prior Publication Data

US 2008/0187044 A1 Aug. 7, 2008

(30) Foreign Application Priority Data

Feb. 5, 2007 (KR) ........................ 10-2007-0011821

(51) Int. Cl.  
*H04B 1/66* (2006.01)

(52) U.S. Cl. .......... 375/240.14; 375/240.12; 375/240.16

(58) Field of Classification Search ............. 375/240.12, 375/240.14, 240.16  
See application file for complete search history.

(56) References Cited

U.S. PATENT DOCUMENTS

| 5,089,889 A | 2/1992 | Sugiyama |
| 6,782,052 B2 | 8/2004 | Sun et al. |
| 7,526,025 B2 * | 4/2009 | Turaga et al. ............ 375/240.12 |
| 2006/0008006 A1 | 1/2006 | Cha et al. |
| 2006/0165171 A1 * | 7/2006 | Cha et al. ................. 375/240.12 |
| 2007/0009044 A1 * | 1/2007 | Tourapis et al. ......... 375/240.25 |
| 2007/0025439 A1 * | 2/2007 | Han et al. .................. 375/240.1 |
| 2007/0201828 A1 * | 8/2007 | Tao et al. ........................ 386/95 |
| 2007/0211797 A1 * | 9/2007 | Kim et al. ................ 375/240.12 |

FOREIGN PATENT DOCUMENTS

WO WO 2004/064255 A2 * 7/2004

OTHER PUBLICATIONS

Wiegand, Thomas et. al.: "Overview of the H.264/AVC Video Coding Standard" IEEE Transactions on Circuits and Systems for Video Technology, IEEE Service Center, Piscataway, NJ, vol. 13, No. 7; Jul. 1, 2003, pp. 560-576.

European Search Report dated Dec. 13, 2010, issued in corresponding European Patent Application No. 08704655.3.

* cited by examiner

Primary Examiner — Jason Mattis  
(74) Attorney, Agent, or Firm — Sughrue Mion, PLLC

(57) ABSTRACT

A method and apparatus for encoding and decoding based on inter prediction are provided. In the encoding method, a current block is encoded by respectively performing intra prediction on the current block and a reference block in a reference picture which corresponds to the current block, and performing inter prediction on the current block based on the results of performing intra prediction. Accordingly, it is possible to reduce the size of data regarding the current block, which is generated as a result of performing inter prediction, thereby improving the compression rate of video data.

17 Claims, 6 Drawing Sheets

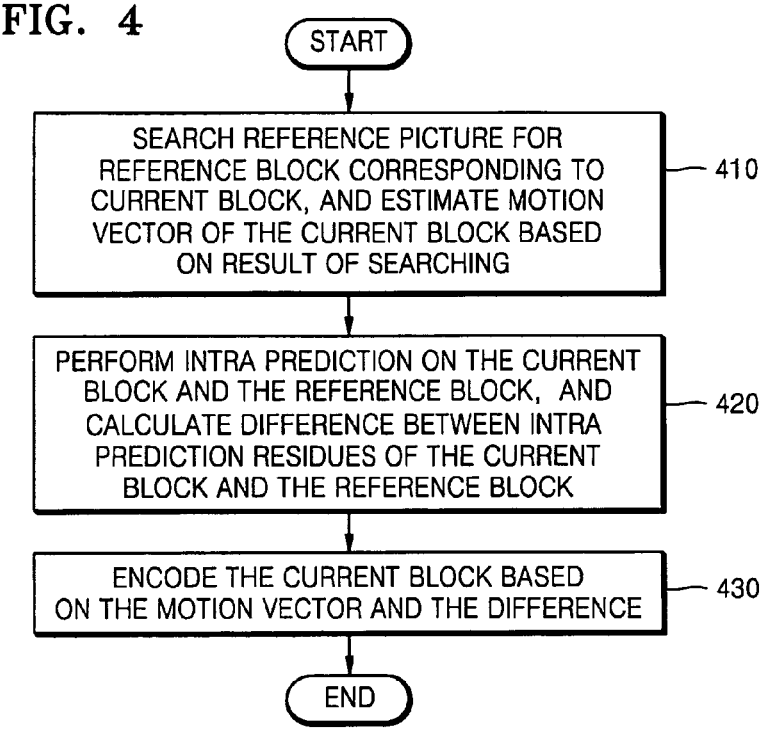
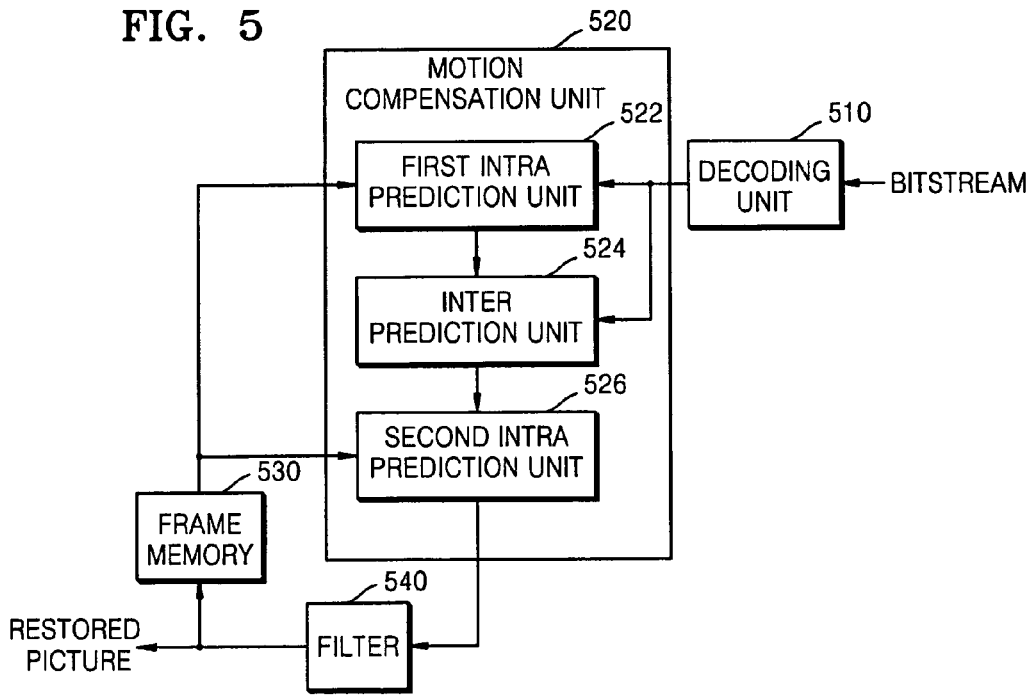

METHOD AND APPARATUS FOR ENCODING AND DECODING BASED ON INTER PREDICTION

CROSS-REFERENCE TO RELATED PATENT APPLICATIONS

This application claims priority from Korean Patent Application No. 10-2007-0011821, filed on Feb. 5, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding based on inter prediction, and more particularly, to performing inter prediction so as to minimize a residue of a current block that is to be encoded, and encoding and decoding the current block based on the result of performing inter prediction.

2. Description of the Related Art

In video compression methods, such as MPEG-1, MPEG-2, and MPEG-4 H.264/MPEG-4 Advanced Video Coding (AVC), a picture is divided into macroblocks in order to encode the picture. Next, each of the macroblocks is encoded using inter prediction and intra prediction. An optimal encoding mode is then selected in consideration of the data sizes of the encoded macroblocks and the extent of degradation of the original macroblocks, and the macroblocks are encoded according to the optimal coding mode.

In related art methods of encoding an image by using inter prediction, the image is compressed by removing temporal redundancies among pictures, and a representative example of the above methods is motion estimation-based encoding.

In the motion estimation-based encoding method, an image is encoded by estimating and compensating for the motion of a current picture by using one or more reference pictures. In this case, a reference block most similar to a current block is detected within a predetermined search range of the reference picture, using a predetermined evaluation function. If the similar reference block is detected, only a between the current block and the similar reference block in the reference picture is transmitted, thereby increasing the compression rate of data. Various-sized blocks, e.g., a 16×16 block, an 8×16, and an 8×8 block, may be used as the current block, which will be described in greater detail with reference to FIG. 1A.

FIG. 1A illustrates a related art inter prediction method. Referring to FIG. 1A, inter prediction is performed using a reference picture in order to encode or decode an image.

In order to perform inter prediction on a current block 112 (an object of encoding) of a current picture 110, a video encoding apparatus detects a reference block 122 most similar to the current block 112 from a reference picture 120. Here, the reference block 122 is a block that is most appropriate for predicting the current block 112, and thus, a block having the smallest residue with the current block 112 may be selected as the reference block 122.

The reference block 122 is used as a prediction value of the current block 112, and thus, only the residue between the pixel values of the current block 112 and the reference block 122 is encoded in order to generate a bitstream. In this case, the distance between the location of the current block 112 in the current picture 110 and the location of reference block 122 is determined to be a motion vector 130. Information regarding the motion vector 130 is inserted into the overhead of the bitstream that is to be transmitted. Since only the residue is transmitted in order to increase the rate of video compression, the smaller the residue, the greater the rate of video compression.

In intra prediction, a reference picture is not used to encode a current block in a current picture. Rather, a prediction value of the current block is calculated using a previously encoded region of the current picture. An intra prediction mode is classified into a 4×4 intra prediction mode, an 8×8 intra prediction mode, and a 16×16 intra prediction mode according to luminance components, and an intra prediction mode according to chrominance components.

FIG. 1B illustrates a related art intra prediction method. Referring to FIG. 1B, for video encoding/decoding, intra prediction is performed using a previously encoded region 142 of a current picture 140.

A prediction value of a current block 146 is generated using pixels 148, adjacent to the current block 146, which are included in the previously encoded region 142. Intra prediction is performed on the current block 146 in various intra prediction modes, that is, in units of various sizes and in various intra prediction directions, and the prediction value of the current block 146 is generated according to an optimal intra prediction mode selected from among the various intra prediction modes. After generating the prediction value, only the residue between a pixel value of the current block 146 and a prediction value is encoded, thereby increasing the compression rate of video encoding.

As described above with reference to FIGS. 1A and 1B, in order to reduce the amount of information that is to be encoded, both inter prediction-based encoding and intra prediction-based encoding respectively include performing inter prediction and intra prediction so as to obtain a prediction value of a current block, generating only a residue from the prediction value, and encoding and transmitting the residue. That is, if the residue of the current block can be significantly reduced, the compression rate of video encoding is increased accordingly.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above The present invention provides a method and apparatus for prediction-based encoding and decoding, which are capable of minimizing a residue of a current block during inter prediction.

The present invention also provides a computer readable medium having recorded thereon a computer program for executing the above method.

According to an aspect of the present invention, there is provided a method of encoding based on inter prediction, the method comprising searching a reference picture for a reference block corresponding to a current block, and estimating a motion vector of the current block based on the reference block; performing intra prediction on each of the current block and the reference block so as to obtain intra prediction residues of the current block and the reference block, and calculating the difference between the intra prediction residues; and encoding the current block based on the motion vector and the difference.

Intra prediction may be respectively performed on the current block and the reference block according to the same intra prediction mode.

According to another aspect of the present invention, there is provided an apparatus for encoding based on inter prediction, the apparatus comprising a motion estimation unit searching a reference picture for a reference block corresponding to a current block, and estimating a motion vector of the current block based on the result of searching; a motion compensation unit respectively performing intra prediction on the current block and the reference block, and calculating the difference between intra prediction residues of the current block and the reference block which are obtained by performing intra prediction; and an encoding unit encoding the current block based on the motion vector and the difference.

According to another aspect of the present invention, there is provided a method of decoding based on inter prediction, the method comprising receiving a bitstream containing data regarding a current block that is encoded by respectively performing intra prediction on a current block and a reference block corresponding to the current block so as to obtain intra prediction residues of the current block and the reference block, calculating the difference between the intra prediction residues, and encoding the current block based on a motion vector of the current block and the difference, where the reference block is searched for in a reference picture; extracting from the bitstream data regarding the current block and information regarding an inter prediction mode of the current block; and restoring the current block based on the data regarding the current block and the information regarding the inter prediction mode.

According to another aspect of the present invention, there is provided an apparatus for decoding based on inter prediction, the apparatus comprising a decoding unit receiving a bitstream that contains data regarding a current block and extracting from the bitstream the data regarding the current block and information regarding an inter prediction mode of the current block, where the current block is encoded by respectively performing intra prediction on the current block and a reference block corresponding to the current block so as to obtain intra prediction residues of the current block and the reference block, calculating the difference between the intra prediction residues, and encoding the current block based on a motion vector of the current block and the difference, and the reference block is searched for in a reference picture; and a motion compensation unit restoring the current block based on the data regarding the current block and the information regarding the inter prediction mode.

According to another aspect of the present invention, there is provided a computer readable medium having recorded thereon a computer program for executing the encoding method and the decoding method.

BRIEF DESCRIPTION OF THE DRAWINGS

The above and other aspects of the present invention will become more apparent by describing in detail exemplary embodiments thereof with reference to the attached drawings in which:

FIG. 4 is a flowchart illustrating an inter prediction method according to an exemplary embodiment of the present invention;
FIG. 5 is a block diagram of an apparatus for decoding based on inter prediction, according to an exemplary embodiment of the present invention.

DETAILED DESCRIPTION OF THE INVENTION

The present invention will now be described more fully with reference to the accompanying drawings, in which exemplary embodiments of the invention are shown.

Figure 2:
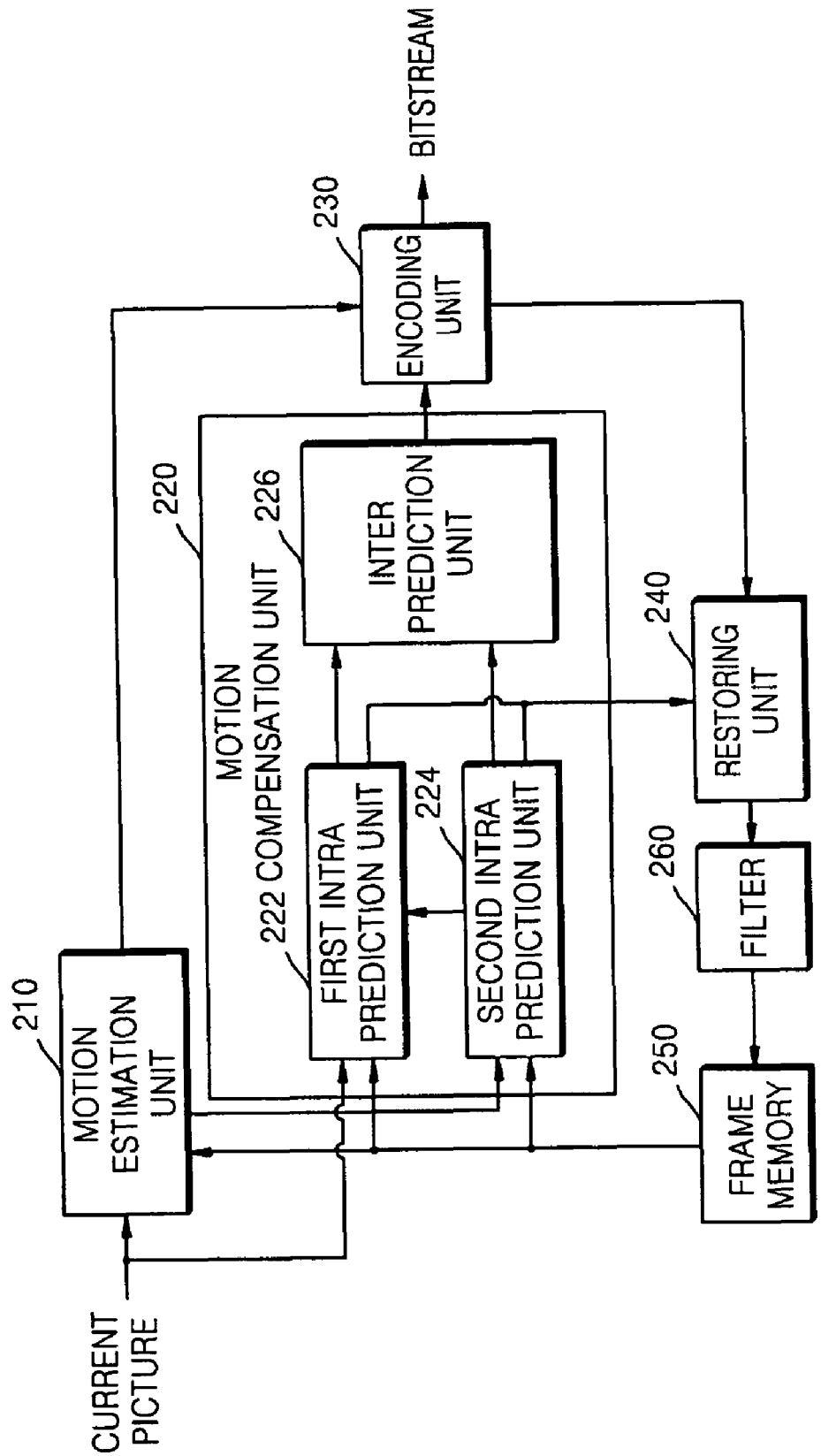
FIG. 2 is a block diagram of an apparatus for encoding based on inter prediction, according to an exemplary embodiment of the present invention.

FIG. 2 is a block diagram of an apparatus for encoding based on inter prediction ("the apparatus"), according to an exemplary embodiment of the present invention. Referring to FIG. 2, the apparatus includes a motion estimation unit 210, a motion compensation unit 220, an encoding unit 230, a restoring unit 240, a frame memory 250, and a filter 260. The motion compensation unit 220 and the encoding unit 230 correspond to an apparatus for encoding based on inter prediction according to the present invention.

The motion estimation unit 210 searches the frame memory 250 for a reference block corresponding to a current block, and estimates a motion vector for the current block by using the reference block.

Figure 1A:
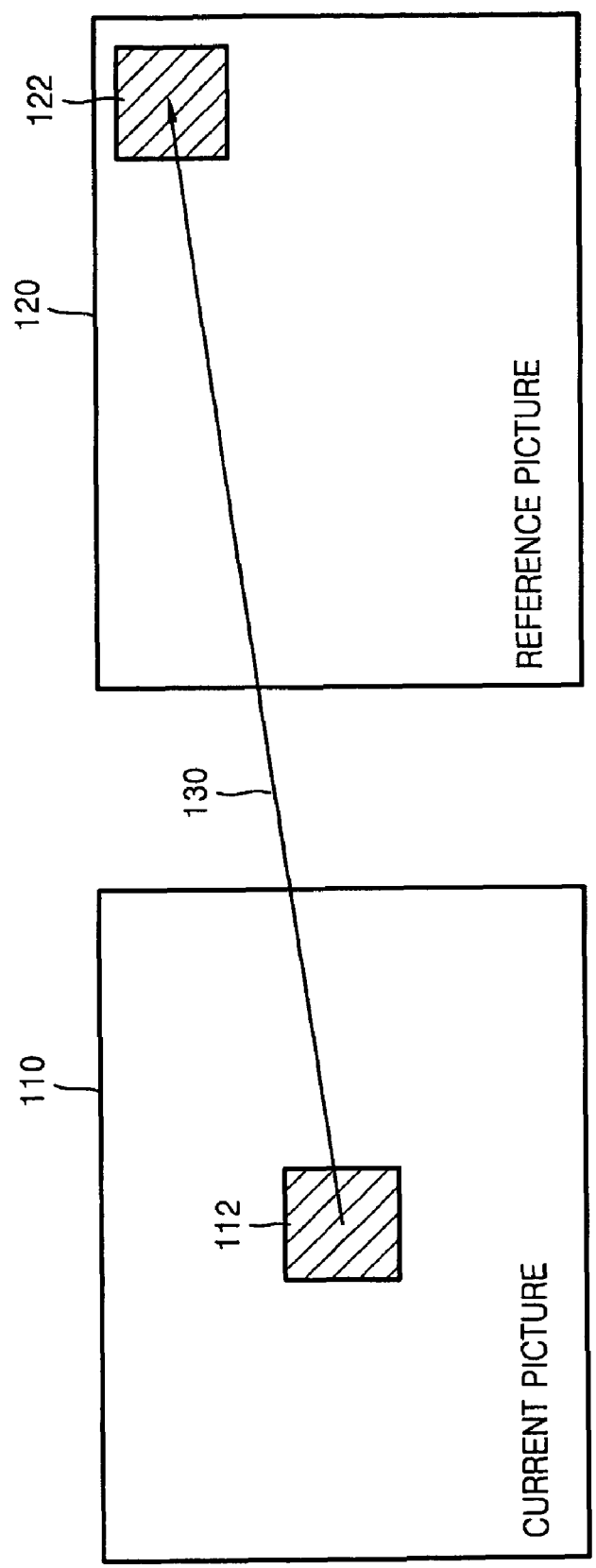
FIG. 1A illustrates a related art inter prediction method.
Figure 1B:
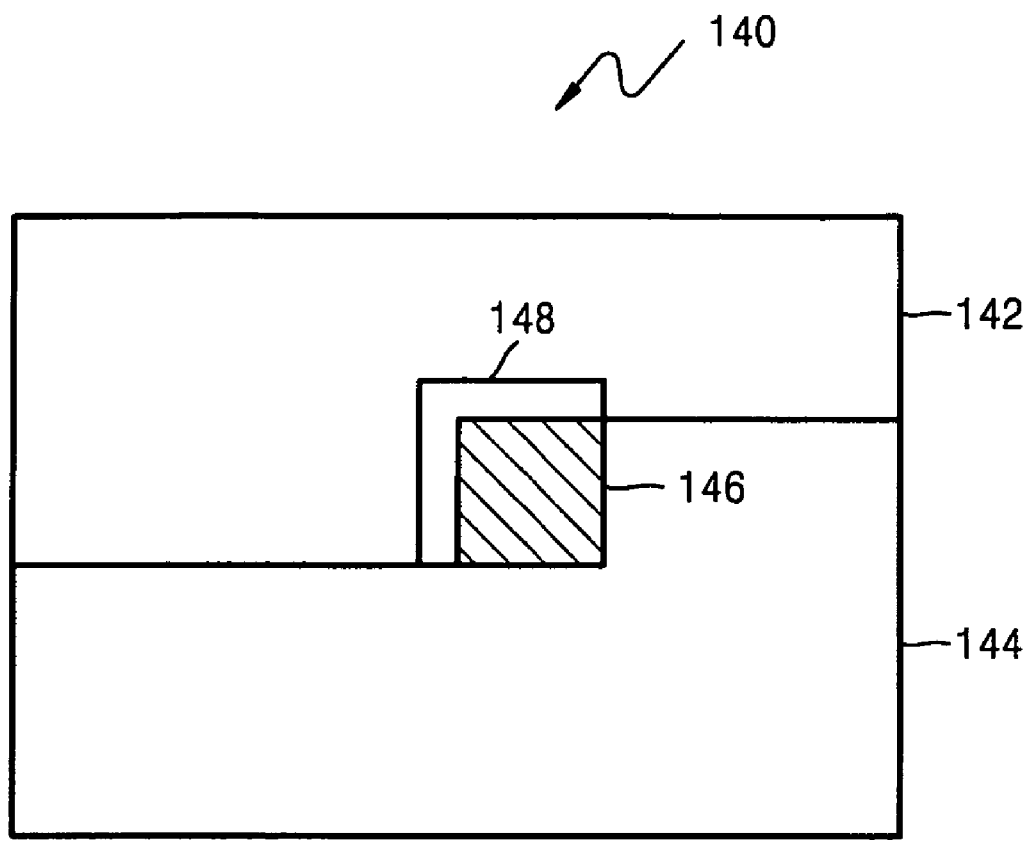
FIG. 1B illustrates a related art intra prediction method.

As illustrated in FIG. 1A, the reference block is detected from the reference picture by using a pixel value of the current block. If the reference block 122 is determined, the distance between the locations of the current block in a current picture and the reference block in the reference picture is calculated so as to generate the motion vector for the current block.

The motion compensation unit 220 performs inter prediction according to the exemplary embodiment of the present invention. That is, intra prediction is performed on the current block and the reference block, and the difference between residues of the current block and the reference block, which are obtained by performing intra prediction, is calculated.

An inter prediction method according to the exemplary embodiments of the present invention is achieved from a combination of a related art intra prediction method and a related art inter prediction method in order to minimize a residue of a current block. The motion compensation unit 220 performs the above inter prediction method which will now be described in greater detail with reference to FIG. 3.

Figure 3:
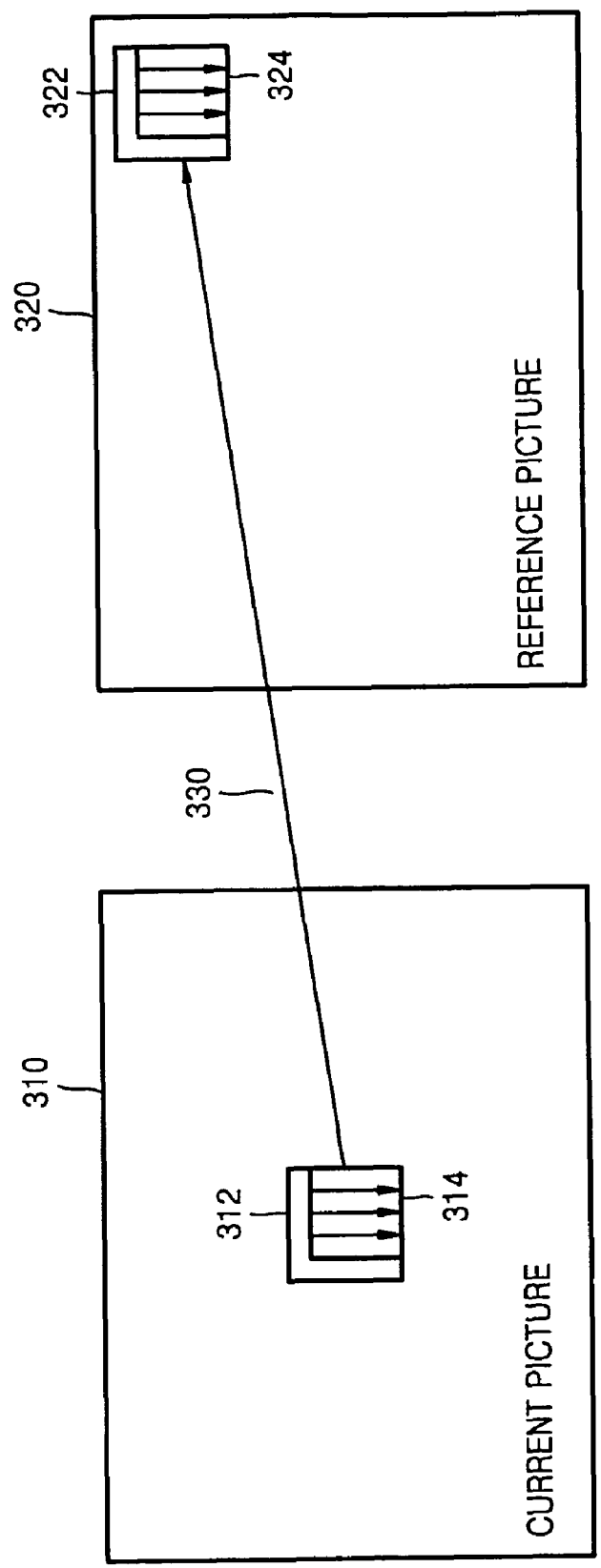
FIG. 3 illustrates an inter prediction method according to an exemplary embodiment of the present invention.

FIG. 3 illustrates an inter prediction method according to an exemplary embodiment of the present invention. Referring to FIGS. 2 and 3, the motion compensation unit 220 performs inter prediction using the reference block 324 in the reference picture 320 in order to predict the current block 314 in the current picture 310. The motion estimation unit 210 determines the reference block 324 in the reference picture 320 corresponding to the current block 314 in the current picture 310, and calculates a motion vector 330. Then, the motion compensation unit 220 performs inter prediction according to the exemplary embodiments of the present invention. Inter prediction using a reference picture and a reference block will now be described. However, it would be apparent to those of ordinary skill in the art that an inter prediction method according to the exemplary embodiments of the present invention is not limited to using a single reference picture and a single reference block. For example, inter prediction according to the exemplary embodiments of the present invention may be performed using a plurality of reference pictures and a plurality of reference blocks.

The motion compensation unit 220 first generates an intra prediction value of the current block 314. The motion compensation unit 220 preferably performs intra prediction using the pixel values of pixels 312, adjacent to the current block 314, which are included in a previously encoded region of the current picture 310

If the intra prediction value of the current block 314 is generated as the result of performing intra prediction, the intra prediction value is subtracted from the pixel value of the current block 314, thereby obtaining an intra prediction residue of the current block 314.

Next, the motion compensation unit 220 generates an intra prediction value of the reference block 324 determined by the motion estimation unit 210. Similar to when the intra prediction value of the current block 314 is generated, intra prediction is performed using the pixel values of the pixels 322 adjacent to the reference block 324.

If the intra prediction value of the reference block 324 is generated as a result of performing intra prediction, the generated intra prediction value is subtracted from the pixel value of the reference block 324, thereby obtaining an intra prediction residue of the reference block 324.

After generating both the intra prediction residue of the current block 314 and the intra prediction residue of the reference block 324, an inter prediction residue is generated from the generated intra prediction residues. The inter prediction residue is preferably obtained by subtracting the intra prediction residue of the reference block 324 from the intra prediction residue of the current block 314.

In order to decode the current block 314 that has been encoded based on the inter prediction method according to the present invention, information regarding an intra prediction mode applied to the current block 314 is necessary. In other words, the information regarding a direction of intra prediction for the current block 314 is needed to decode the current block 314. Thus, even if a residue is minimized, the information regarding the intra prediction direction is added into the overhead of a bitstream, thereby degrading the effect of reducing the compression rate of video encoding.

According to the exemplary embodiment of the present invention, in order to prevent this problem, the intra prediction mode used for intra prediction of the reference block 324 is also used to perform intra prediction on the current block 314. The reference block 324 is included in the reference picture 320 that has already been encoded or decoded. Accordingly, an intra prediction mode for the reference block 324 is first determined, and the determined intra prediction mode is applied to intra prediction of the current block 314, thereby removing a need for inserting the information regarding the intra prediction mode for the current block 314 into the overhead of the bitstream.

In the inter prediction method according to the present invention, data regarding a current block is an inter prediction residue that is the difference between two intra prediction residues. In the related art, a residue is obtained by subtracting a pixel value of a reference block as a prediction value of a current block from a pixel value of the current block, and the residue is encoded. However, according to an exemplary embodiment of the present invention, only the difference between intra prediction residues of a current block and a reference block is encoded so as to reduce the size of a residue that is to be encoded. The advantage of the present invention obtained in this case is shown by Equation (1) below.

$$\text{Inter prediction residue} = (O-F(o))-(P-F(r))=O-[P+(F(o)-F(r))] \quad (1),$$

wherein O denotes the pixel value of the current block 314; F(o) denotes the intra prediction value of the current block 314, which is obtained by performing intra prediction; P denotes the pixel value of the reference block 324; and F(r) denotes the intra prediction value of the reference block 324, which is obtained by performing intra prediction.

As disclosed in Equation (1), according to an exemplary embodiment of the present invention, an inter prediction residue is calculated by subtracting the residue of the reference block 324 (the difference between the pixel value and the prediction value of the reference block 324) from the residue of the current block 314 (the difference between the pixel value and the prediction value of the current block 314).

In other words, the inter prediction residue is obtained by subtracting the sum of the differences between the pixel value of the reference block 324 and each of the intra prediction values of the reference block 324 from the pixel value of the current block 314.

Referring to Equation (1), according to a related art method, (O−P) is an inter prediction residue, but according to an exemplary embodiment of the present invention, a value obtained by subtracting (F(o)−F(r)) from (O−P) is an inter prediction residue, that is, the residue can be reduced thus improving the compression rate of video encoding. If (F(o)−F(r)) is a negative value, it is possible to adaptively minimize the residue that is to be used in inter prediction-based encoding by subtracting the absolute value of the negative value from (O−P), or encoding only (O−P) as suggested in the related art method.

Referring to FIG. 2, according to an exemplary embodiment of the present invention, the motion compensation unit 220 includes a first intra prediction unit 222, a second intra prediction unit 224, and an inter prediction unit 226.

The first intra prediction unit 222 generates an intra prediction value of the current block 314 by using pixels, adjacent to the current block 314, which are included in a previously encoded region of a current picture stored in the frame memory 250. If the intra prediction value is generated, the intra prediction value is subtracted from the pixel value of the current block 314 in order to generate an intra prediction residue of the current block 314.

The second intra prediction unit 224 performs intra prediction on the reference block 324, corresponding to the current block 314, which is determined by the motion estimation unit 210. That is, an intra prediction value is obtained by performing intra prediction on the reference block 324 based on the reference picture 320 stored in the frame memory 250. If the intra prediction value is obtained, the intra prediction value is subtracted from the pixel value of the reference block 324 in order to generate an intra prediction residue of the reference block 320. Also, information regarding an intra prediction mode in which intra prediction has been performed is transmitted to the first intra prediction unit 222, so that the first intra prediction unit 222 can perform intra prediction according to the same intra prediction mode in which the second intra prediction unit 224 operates.

The inter prediction unit 226 receives the intra prediction residue, of the current block 314, which is generated by the first intra prediction unit 222, and the intra prediction residue, of the reference block 324, which is generated by the second intra prediction unit 224; and generates an inter prediction residue of the current block 314. The inter prediction residue may be generated by subtracting the intra prediction residue of the reference block 324 from the intra prediction residue of the current block 314.

The encoding unit 230 encodes the generated inter prediction residue into a bitstream by transforming the inter prediction residue into a frequency domain and performing quantization and entropy encoding on the frequency domain. In this case, information regarding a motion vector of the current block 314 is received from the motion estimation unit 210 and inserted into the overhead of the bitstream.

The restoring unit 240 receives data regarding the encoded inter prediction residue from the encoding unit 230, and performs inverse quantization and inverse transformation thereon so as to restore the inter prediction residue of the current block 314. The restoring unit 240 restores the current block 314 by using the intra prediction value of the current block 314 received from the first intra prediction unit 222 and the intra prediction residue of the reference block 324 received from the second intra prediction unit 224. The intra prediction residue of the current block 314 is first generated by combining the intra prediction residue of the reference block 324 received from the second intra prediction unit 224 and the restored inter prediction residue. Then, the current block 314 is restored by combining the generated intra prediction residue of the current block 314 and the intra prediction value of the current block 314.

The filter 260 performs deblocking filtering on the restored current block 314, and stores the result of filtering in the frame memory 250. The frame memory 250 stores not only the previously encoded region, of the current picture 310, which is used to perform intra prediction on the current block 314, but also information regarding the reference picture 320. The first intra prediction unit 222 and the second intra prediction unit 224 perform intra prediction based on the previously encoded region and the information regarding the reference picture 320.

FIG. 4 is a flowchart illustrating a method of encoding based on inter prediction according to an exemplary embodiment of the present invention. Referring to FIGS. 2 and 4, an inter prediction-based encoding apparatus ("the encoding apparatus") according to the exemplary embodiment of the present invention searches a reference picture for a reference block corresponding to a current block, and estimates a motion vector for the current block based on the reference block (operation 410). That is, a reference block corresponding to the current block is searched for in a reference picture stored in the frame memory 250, and the distance between the locations of the current block in a current picture and the reference block in the reference picture is calculated so as to generate a motion vector.

Next, the encoding apparatus performs intra prediction on each of the current block and the reference block so as to obtain intra prediction residues of the current block and the reference block, and calculates the difference between the intra prediction residues (operation 420).

Specifically, the intra prediction value of the current block is generated by performing intra prediction on the current block by using pixels, adjacent to the current block, which are included in a previously encoded region in the current picture; and the intra prediction value of the reference block is generated by performing intra prediction on the reference block using pixels adjacent to the reference block. After performing intra prediction, an intra prediction residue of the current block is generated by subtracting the intra prediction value of the current block from a pixel value of the current block, and an intra prediction residue of the reference block is generated by subtracting the intra prediction value of the reference block from a pixel value of the reference block. Intra prediction is preferably, respectively performed on the current block and the reference block according to the same intra prediction mode. Next, the intra prediction residue of the reference block is subtracted from the intra prediction residue of the current block so as to calculate the difference between the intra prediction residues.

Next, the encoding apparatus encodes the motion vector estimated in operation 410, and the difference between the intra prediction residues calculated in operation 420, that is, an inter prediction residue (operation 430).

FIG. 5 is a block diagram of an inter prediction-based decoding apparatus according to an exemplary embodiment of the present invention. Referring to FIG. 5, the decoding apparatus includes a decoding unit 510, a motion compensation unit 520, a frame memory 530, and a filter 540.

The decoding unit 510 receives a bitstream that contains data regarding a current block that has been encoded based on inter prediction according to the inter prediction method illustrated in FIG. 3, and extracts the data regarding the current block and information regarding an inter prediction mode from the bitstream.

Entropy decoding is performed on the bitstream so as to extract the information regarding the inter prediction mode from the bitstream. Also, inverse quantization and inverse transformation are performed on a quantized coefficient generated as the result of performing entropy decoding so as to generate an inter prediction residue of the current block. The information regarding the inter prediction mode indicates that the current block has been encoded according to an inter prediction-based encoding method. Also, the information regarding the inter prediction mode further contains information regarding a motion vector used to perform inter prediction on the current block.

The inter prediction residue is the difference between intra prediction residues of the current block and a reference block, and data regarding the current block encoded based on the inter prediction method illustrated in FIG. 3.

The motion compensation unit 520 restores the current block based on the data regarding the current block (the inter prediction residue) which is extracted by the decoding unit 510, and the information regarding the inter prediction mode.

According to an exemplary embodiment of the present invention, the motion compensation unit 520 includes a first intra prediction unit 522, an inter prediction unit 524, and a second intra prediction unit 526.

The first intra prediction unit 522 sets the reference block by referring to the frame memory 530, and performs intra prediction on the reference block. The information regarding the inter prediction mode, which is extracted by the decoding unit 510, contains the motion vector. Thus, the reference block that is to be used to perform inter prediction on a current block stored in the frame memory 530 is set based on the motion vector, and intra prediction is performed on the reference block by using pixels adjacent to the reference block.

An intra prediction value of the reference block, which is obtained by performing intra prediction, is compared with the reference block so as to obtain the difference therebetween, i.e., an intra prediction residue of the reference block.

The inter prediction unit 524 generates an intra prediction residue of the current block by combining the intra prediction residue of the reference block, which is generated by the first intra prediction unit 522 and the inter prediction residue extracted by the decoding unit 510.

The second intra prediction unit 526 restores the current block by using the intra prediction residue of the current block generated by the inter prediction unit 524.

That is, intra prediction is performed on the current block using pixels adjacent to the current block, which are included in a previously encoded region of a current picture stored in the frame memory 530. Then, the current block is restored by combining the prediction value of the current block, which is generated by performing intra prediction, and the intra prediction residue of the current block, which is generated by the inter prediction unit 524.

According to an exemplary embodiment of the present invention, since the intra prediction mode for the current block (information regarding a direction of intra prediction) is not contained in the bitstream, intra prediction is performed on the current block according to an intra prediction mode for the reference block.

The filter 540 performs deblocking filtering on a pixel value of the restored current block output by the second intra prediction unit 526, and stores the result of filtering in the frame memory 530 so that the result of filtering can be used in decoding a subsequent block.

Figure 6:
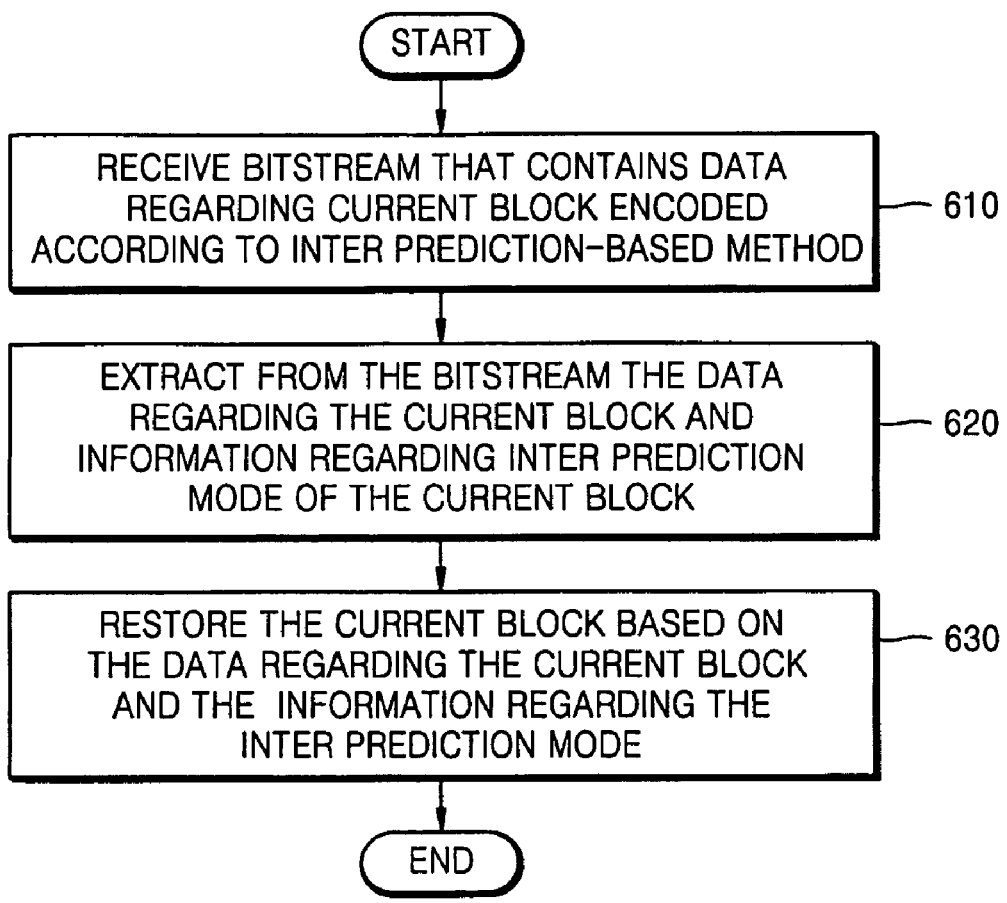
FIG. 6 is a flowchart illustrating a method of decoding based on inter prediction, according to an exemplary embodiment of the present invention.

FIG. 6 is a flowchart illustrating a method of decoding based on inter prediction according to an exemplary embodiment of the present invention. Referring to FIG. 6, an inter prediction-based decoding apparatus ("the decoding apparatus") receives a bitstream that contains data regarding a current block encoded based on the inter prediction method illustrated in FIG. 3 (operation 610).

Next, the decoding apparatus extracts the data regarding the current block and information regarding an inter prediction mode for the current block from the bitstream (operation 620).

The data regarding the current block contains data regarding an inter prediction residue that is the difference between an intra prediction residue of the current block and an intra prediction residue of a reference block. The information regarding the inter prediction mode of the current block contains information indicating that the current block has been encoded according to the inter prediction-based encoding method according to the exemplary embodiment of the present invention, and information regarding a motion vector of the current block.

Next, the decoding apparatus restores the current block, based on the data regarding the current block and the information regarding the inter prediction mode which were extracted in operation 620 (operation 630).

The reference block is determined based on the motion vector extracted in operation 620, and an intra prediction residue of the reference block is generated. The intra prediction residue of the reference block is combined with the inter prediction residue extracted in operation 620, thereby generating an intra prediction residue of the current block. The intra prediction residue of the current block is subtracted from an intra prediction value of the current block, thereby restoring the current block.

The present invention can be embodied as computer readable code in a computer readable medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

According to the exemplary embodiment of the present invention, only an inter prediction residue, which is the difference between intra prediction residues of a current block and a reference block, is encoded so as to reduce a residue, thereby improving the compression rate of video encoding.

Also, it is possible to perform intra prediction on the current block without inserting information regarding an intra prediction mode (a direction of intra prediction) into a bitstream, thereby improving the compression rate of video encoding.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding based on inter prediction, the method comprising:
   searching a reference picture for a reference block corresponding to a current block in a current picture, and estimating a motion vector of the current block based on the reference block;
   performing intra prediction on each of the current block and the reference block to obtain an intra prediction residue of the current block and an intra prediction residue of the reference block, and calculating a difference between the intra prediction residue of the current block and the intra prediction residue of the reference block; and
   encoding the current block based on the motion vector and the difference between the intra prediction residue of the current block and the intra prediction residue of the reference block,
   wherein the current picture and the reference picture have different temporal positions.

2. The method of claim 1, wherein the calculating the difference between the intra prediction residue of the current block and the intra prediction residue of the reference block comprises:
   performing intra prediction on the current block to obtain the intra prediction residue of the current block;
   performing intra prediction on the reference block to obtain the intra prediction residue of the reference block; and
   obtaining the difference between the intra prediction residue of the current block and the intra prediction residue of the reference block by subtracting the intra prediction residue of the reference block from the intra prediction residue of the current block.

3. The method of claim 2, wherein intra prediction is respectively performed on the current block and the reference block by using pixel values of pixels adjacent to the current block and pixel values of pixels adjacent to the reference block.

4. The method of claim 3, wherein intra prediction is performed on the current block and the reference block according to a same intra prediction mode.

5. An apparatus for encoding based on inter prediction, the apparatus comprising:
   a motion estimation unit which searches a reference picture for a reference block corresponding to a current block, and estimates a motion vector of the current block based on the reference block;
   a motion compensation unit which performs intra prediction on the current block and the reference block, and calculates a difference between an intra prediction residue of the current block and an intra prediction residue of the reference block which are obtained by performing intra prediction; and
   an encoding unit which encodes the current block based on the motion vector and the difference between the intra prediction residue of the current block the intra prediction residue of the reference block, wherein the current picture and the reference picture have different temporal positions.

6. The apparatus of claim 5, wherein the motion compensation unit comprises:
   a first intra prediction unit which performs intra prediction on the current block to generate the intra prediction residue of the current block;
   a second intra prediction unit which performs intra prediction on the reference block to generate the intra prediction residue of the reference block; and
   an inter prediction unit which subtracts the intra prediction residue of the reference block from the intra prediction residue of the current block so as to obtain the difference between the intra prediction residues.

7. The apparatus of claim 6, wherein the first intra prediction unit performs intra prediction using pixel values of pixels adjacent to the current block, and
   the second intra prediction unit performs intra prediction using pixel values of pixels adjacent to the reference block.

8. The apparatus of claim 7, wherein the first intra prediction unit and the second intra prediction unit respectively perform intra prediction on the current block and the reference block according to a same intra prediction mode.

9. A method of decoding based on inter prediction, the method comprising:
   receiving a bitstream containing data regarding a current block that is encoded based on a motion vector of the current block and a difference between an intra prediction residue of the current block and an intra prediction residue of a reference block;
   extracting from the bitstream data regarding the current block and information regarding an inter prediction mode of the current block; and
   restoring the current block based on the data regarding the current block and the information regarding the inter prediction mode of the current block,
   wherein the current block is a block of a current picture and the reference block is a block of a reference picture, and the current picture and the reference picture have different temporal positions.

10. The method of claim 9, wherein the data regarding the current block is related to the difference obtained by subtracting the intra prediction residue of the reference block from the intra prediction residue of the current block.

11. The method of claim 10, wherein the restoring the current block comprises:
    performing intra prediction on the reference block to generate the intra prediction residue of the reference block;
    combining the difference between the intra prediction residue of the reference block and the intra prediction residue of the current block with the intra prediction residue of the reference block to generate the intra prediction residue of the current block; and
    performing intra prediction on the current block to generate an intra prediction value, and combining the intra prediction value of the current block with the intra prediction residue of the current block to restore the current block.

12. The method of claim 10, wherein intra prediction is performed on the reference block and the current block according to a same intra prediction mode.

13. An apparatus for decoding based on inter prediction, the apparatus comprising:
    a decoding unit which receives a bitstream that contains data regarding a current block and extracting from the bitstream the data regarding the current block and information regarding an inter prediction mode of the current block, where the current block is encoded based on a motion vector of the current block and a difference between an intra prediction residue of the current block and an intra prediction residue of a reference block;
    a motion compensation unit which restores the current block based on the data regarding the current block and the information regarding the inter prediction mode,
    wherein the current block is a block of a current picture and the reference block is a block of a reference picture, and the current picture and the reference picture have different temporal positions.

14. The apparatus of claim 13, wherein the data regarding the current block is related to the difference obtained by subtracting the intra prediction residue of the reference block from the intra prediction residue of the current block.

15. The apparatus of claim 14, wherein the motion compensation unit comprises:
    a first intra prediction unit which performs intra prediction on the reference block to generate the intra prediction residue of the reference block;
    an inter prediction unit which combines the intra prediction residue of the reference block with the difference between the intra prediction residue of the current block and the intra prediction residue of the reference block to generate the intra prediction residue of the current block; and
    a second intra prediction unit which performs intra prediction on the current block to generate an intra prediction value of the current block, and combines the intra prediction value of the current block with the intra prediction residue of the current block so as to restore the current block.

16. The apparatus of claim 14, wherein the first intra prediction unit and the second intra prediction unit respectively perform intra prediction on the reference block and the current block according to a same intra prediction mode.

17. A non-transitory computer readable medium having recorded thereon a computer program for executing a method of decoding based on inter prediction, the method comprising:
    receiving a bitstream containing data regarding a current block that is encoded based on a motion vector of the current block and a difference between an intra prediction residue of the current block and an intra prediction residue of a reference block;
    extracting from the bitstream data regarding the current block and information regarding an inter prediction mode of the current block; and
    restoring the current block based on the data regarding the current block and the information regarding the inter prediction mode of the current block,
    wherein the current block is a block of a current picture and the reference block is a block of a reference picture, and the current picture and the reference picture have different temporal positions.

* * * * *